BEAM CONVERGENCE SYSTEM FOR TRI-COLOR KINESCOPE

Filed Nov. 20, 1953 2 Sheets-Sheet 1

INVENTOR.
MORRIS D. NELSON
BY [signature]
ATTORNEY

INVENTOR.
MORRIS D. NELSON

BY [signature]
ATTORNEY

United States Patent Office 2,749,473

Patented June 5, 1956

2,749,473

BEAM CONVERGENCE SYSTEM FOR TRI-COLOR KINESCOPE

Morris D. Nelson, New York, N. Y., assignor to Radio Corporation of America, a corporation of Delaware Application November 20, 1953, Serial No. 393,327

8 Claims. (Cl. 315—13)

This invention relates to systems for controlling the electron beam energy of cathode ray tubes. It pertains particularly to the control of a plurality of electron beam components used in television kinescopes so as to effect substantial convergence of the beam components at all points of a raster scanned in a predetermined plane.

One type of cathode ray tube in which there is encountered the problem of maintaining substantial convergence of a plurality of beam components at a target electrode is a color kinescope such as that disclosed in a paper by H. B. Law titled "A Three-Gun Shadow-Mask Color Kinescope" published in the Proceedings of the I. R. E., vol. 39, No. 10, October 1951 at page 1186. Such a tube has a luminescent screen consisting of a multiplicity of phosphor areas of sub-elemental dimensions. Different ones of the phosphor areas are capable of producing light of the component image colors when excited by electron beam energy. In this tube, the different light-producing phosphor areas are excited respectively by a plurality of electron beams, or by a plurality of components of a single beam, approaching the screen from different angles through an apertured electrode. Color selection is secured by the angle at which the electron beam components approach the screen. A tube of the kind described forms the subject matter of U. S. Patent 2,595,548 granted May 6, 1952, to Alfred C. Schroeder for "Picture Reproducing Apparatus."

The expression "electron beam components" as used in this specification and claims will be understood to denote the phosphor-exciting electronic energy produced either by a single, or by a plurality of, electron guns. This energy may be continuous or pulsating as required without departing from the scope of the invention. An example of a color kinescope in which different components of a single electron beam are used to excite a phosphor screen of the kind described is disclosed in a paper by R. R. Law, titled "A One-Gun Shadow-Mask Color Kinescope" published in the Proceedings of the I. R. E., vol. 39, No. 10, October 1951, at page 1194. Such a tube forms the subject matter of a copending U. S. application of Russell R. Law, Serial No. 165,552, filed June 1, 1950, and titled "Color Television."

The successful operation of a multi-color kinescope of the type referred to requires that the plurality of electron beam components be made to converge substantially at the apertured electrode at all points in the scanned raster. In view of the fact that the different points of such a target electrode may be located at different distances from the point or region of the electron beam deflection and because of the fact that the beam components have different effective deflection centers by reason of the necessary spacing of the beam components about the longitudinal axis of the tube, it is necessary to provide field-producing means which is variably energized to produce the desired dynamic convergence control. One such electron beam control system is disclosed in a paper by Albert W. Friend titled "Deflection and Convergence in Color Kinescopes" published in the Proceedings of the I. R. E., vol. 39, No. 10, October 1951 at page 1249. Such a system forms the subject matter of a copending U. S. application of Albert W. Friend, Serial No. 164,444 filed May 26, 1950, and titled "Electron Beam Control System." In the system proposed by Friend, electron-optical apparatus is energized both statically and dynamically to produce the desired result. By means including the static energization of the electron-optical apparatus, the Friend system effects initial convergence of the electron beam components substantially at the center of the raster to be scanned. The dynamic energization of the electron-optical apparatus is effected as functions of both the horizontal and vertical beam deflection. Ideally these functions are substantially parabolic. However, it is somewhat difficult to produce the ideal energizing waveforms, particularly at the vertical deflection frequency.

Therefore, it is an object of this invention to provide improved and simplified apparatus by which to develop waveforms for the dynamic energization of an electron beam-controlling system for a multi-beam kinescope.

Another object of the invention is to provide improved apparatus by which to develop, directly from the deflection apparatus, waveforms for effecting dynamic convergence of the electron beam components of a multi-beam kinescope.

In accordance with this invention, there is provided a convergence control wave generating apparatus including wave shaping networks coupled respectively to the horizontal and vertical deflection circuits to convert deflection wave energy at these two frequencies into waves having suitable shapes and amplitudes to control the beam convergence apparatus of a multi-color kinescope in the desired manner. One of these wave shaping networks is coupled to the output of the vertical deflection apparatus and consists of two branches. In one of the branches, the substantially sawtooth deflection wave is converted into a wave having a generally parabolic shape. In the other of these two branches, there is produced a wave having substantially the same sawtooth form as the deflection wave. The two branches of the vertical wave shaping network are coupled together in a manner to provide suitable amplitudes of the parabolic and sawtooth waves and the combined wave is amplified and impressed in a relatively large magnitude upon the beam convergence apparatus of the kinescope and in a somewhat reduced magnitude upon the individual beam focusing apparatus of the kinescope. The horizontal convergence wave shaping network derives a substantially parabolic wave at the horizontal deflection frequency from the horizontal sweep output circuit. The parabolic wave is amplified and combined with a substantially sinusoidal component at the horizontal deflection frequency derived from a tuned circuit in the output of the parabolic wave amplifier. This combined horizontal convergence wave is then impressed in relatively large magnitude upon the beam convergence apparatus of the kinescope and in relatively small magnitude upon the individual beam focusing apparatus of the kinescope.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

Figures 3*a*–3*e* show a series of curves illustrating different waveforms appearing at different stages of the generation of the vertical frequency convergence wave; and, Figures 4*a*–4*d* show a series of curves illustrating different waveforms appearing at various stages in the generation of the horizontal frequency convergence wave.

Figures 1, 2:
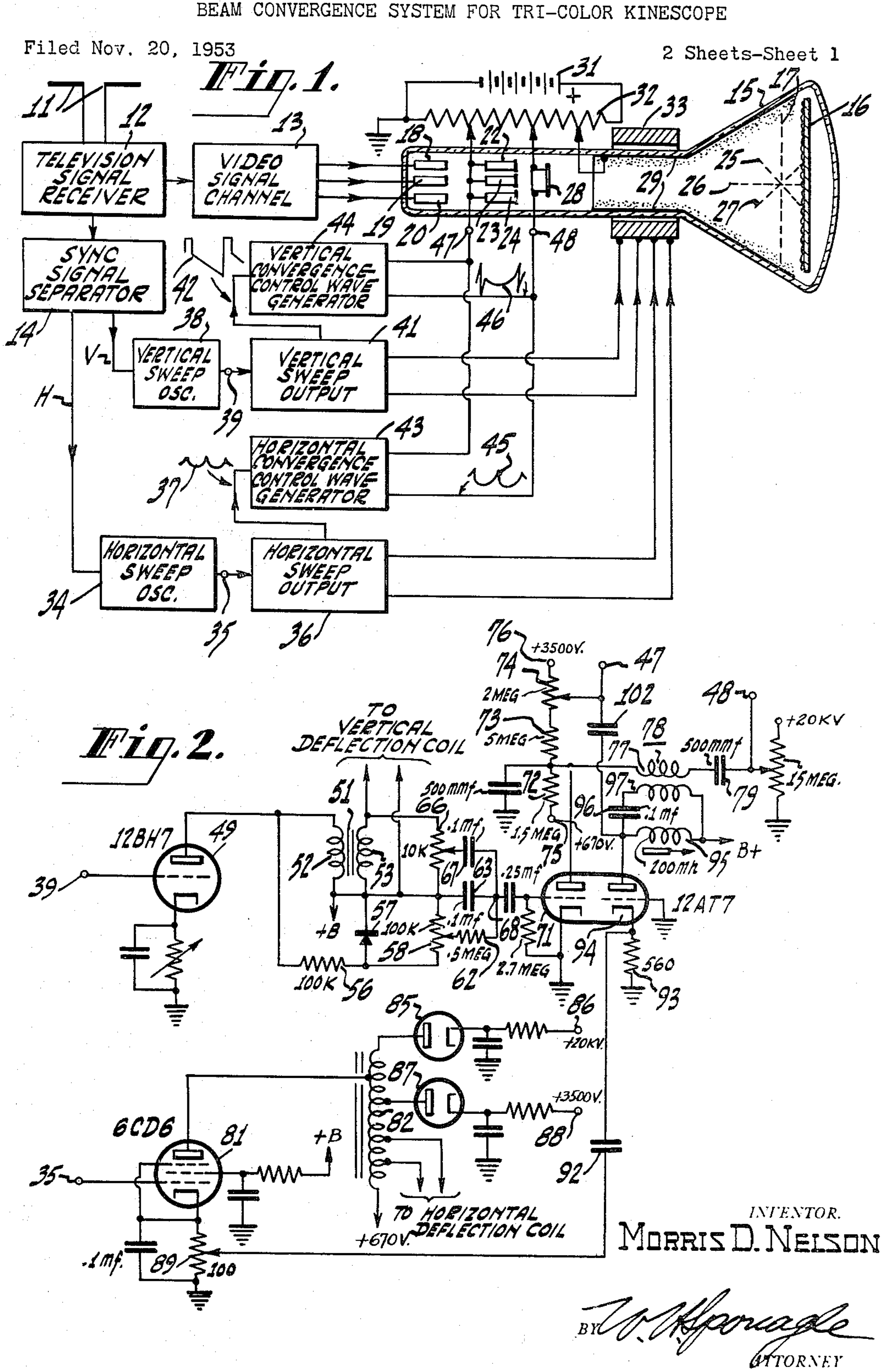
Figure 1 is a block diagram of a representative form of apparatus with which the present invention may be employed.
Figure 2 is a schematic circuit diagram of an illustrative form of a convergence control wave generating apparatus in accordance with the invention.

Reference first will be made to Figure 1 of the drawings for a description of an illustrative embodiment of the invention. The television receiver represented in this figure is generally conventional and includes an antenna 11 to which is coupled a conventional television signal receiver 12. It will be understood that the receiver 12 may include such usual apparatus as carrier wave amplifiers at both radio and intermediate frequencies, a frequency converter and a carrier wave demodulator or signal detector. Accordingly, it will be understood that there are derived from the receiver 12 the video and synchronizing signals. The video signals derived from the receiver 12 are impressed upon a video signal channel 13 and the synchronizing signals are impressed upon a sync signal separator 14. The video signal channel is coupled to the usual electron beam control apparatus, customarily referred to as electron gun apparatus, of an image-reproducing device such as a kinescope 15.

In the illustrative embodiment of the invention, it is assumed that the invention is used in a color television system. In this case, the kinescope is of the same general type disclosed in the H. B. Law paper previously referred to. It will be understood, however, that the kinescope alternatively may be of other types such as that shown in the aforementioned R. R. Law paper. In either case, however, the kinescope has a substantially flat luminescent screen 16 which is provided with a multiplicity of small phosphor areas aranged in groups and capable respectively of producing light of the different primary colors in which the image is to be reproduced when excited by electron beam energy. In back of, and spaced from the screen 16, there is an apertured masking electrode 17 having an aperture for, and in alignment with, each group of phosphor areas of the screen 16. In the particular tube illustrated, the kinescope also has a plurality of electron guns 18, 19 and 20, equal in number to the number of primary colors in which the image is to be reproduced. As previously indicated, these three electron guns are coupled to the video signal channel 13 for respective control by video signals representing the three primary colors in which the image is to be reproduced. It will be understood that each of these guns may be conventional consisting of a cathode, a control grid, and a first anode, or beam-forming electrode. Also associated with the three electron guns are corresponding individual beam-focusing anodes 22, 23 and 24. The three electron guns 18, 19 and 20, together with their associated focusing electrodes 22, 23 and 24 respectively, function to develop respective electron beams 25, 26 and 27 which are caused to approach the target electrode structure, including the luminescent screen 16 and the masking electrode 17, from three different angles which, for convenience, have been shown greatly exaggerated in the drawing. By means of the different angles of approach these beams are caused to excite the different colored light-producing phosphors.

The color kinescope 15 additionally is provided with an electro-static type of beam-converging apparatus which includes a convergence anode 28 located adjacent the paths followed by the electron beams in the predeflection region. The kinescope also includes the usual final, or beam-accelerating, anode 29 generally in the form of a wall coating substantially as shown and extending from the predeflection region adjacent to the convergence anode 28 to the vicinity of the target electrode structure including the screen 16.

The different static potentials which are impressed upon the various kinescope electrodes are derived from a power supply 31, across the terminals of which is connected a voltage divider resistor 32. The various electrode potentials are derived by making suitable connections to the voltage divider resistor generally in the manner shown. The individual beam-focusing electrodes 22, 23 and 24 are connected together with and to a relatively low positive potential point on the voltage divider resistor 32. The convergence anode 28 is coupled to a somewhat higher positive potential point of the resistor 32 so that, as a result of the potential difference between it and the individual beam focusing anodes 22, 23 and 24, there are produced electrostatic electron-optical lenses by which individual beam focusing is effected. In a like manner, the final anode 29 is connected to a relatively high positive potential point on the voltage divider resistor 32 so as to create another electron-optical lens with the convergence anode 28. The purpose of this latter electron-optical device is to produce the desired convergence of the individual electron beams substantially in the plane of the apertured electrode 17.

The color kinescope 15 also is provided with apparatus by which to deflect the plurality of electron beam components both vertically and horizontally to scan the usual rectangular raster at the luminescent screen 16. In this embodiment of the invention, the deflection apparatus includes a yoke 33 which in general is of a conventional type. It consists of a pair of interconnected coils forming a horizontal deflection winding and another pair of coils forming a vertical deflection winding. The yoke is mounted around the neck of the kinescope in the region adjacent to the point at which the neck joins the conical section of the tube.

The horizontal and vertical windings of the yoke 33 are energized by substantially conventional apparatus. The sync signal separator 14, which separates the sync signals from the video signals and from one another, produces horizontal and vertical frequency sync signals respectively in its output circuits "H" and "V". The horizontal output circuit "H" is coupled to a horizontal sweep oscillator 34, the output terminal 35 of which, in turn, is coupled to the input circuit of a horizontal sweep output apparatus 36. Both of these horizontal sweep components may be entirely conventional. The horizontal sweep output apparatus has an output circuit in which a parabolic wave 37 is developed. Another output circuit of the horizontal sweep output apparatus 36 is coupled to the horizontal deflection winding of the yoke 33 in the customary manner.

The vertical sync separator output circuit "V" is coupled to a vertical sweep oscillator 38 which produces at its output terminal 39 a substantially sawtooth deflection wave at the vertical deflection frequency. The output terminal 39 of the vertical sweep oscillator is coupled to the input circuit of a vertical sweep output stage 41 having an output circuit in which a sawtooth deflection wave 42 is developed. Another output circuit of the vertical sweep output apparatus is connected to the vertical deflection winding of the yoke 33.

In order to effect the desired convergence of the electron beam components of the tri-color kinescope 15 at both horizontal and vertical deflection frequencies and also to effect a dynamic control of the focusing of the individual beam components, the horizontal and vertical sweep output stages 36 and 41 respectively are coupled to horizontal and vertical convergence control wave generators 43 and 44. These convergence control wave generators comprise the present invention and the representative circuit arrangements thereof will be described in greater detail subsequently in connection with a reference to Figure 2 of the drawings. In general, the parabolic wave 37 at the line deflection frequency derived from the horizontal sweep output stage 36 is impressed upon the horizontal convergence control wave generator 43 by which it is suitably shaped and amplified to produce a horizontal convergence control wave 45. The substantially sawtooth wave 42 derived from the vertical sweep output stage 41 is impressed upon the input circuit of the vertical convergence control wave generator 44 by which it is converted to a substantially parabolic wave 46. The output circuits of the horizontal and vertical convergence control wave generators 43 and 44 are coupled together as indicated and to a dynamic focusing wave terminal 47 and a dynamic convergence wave terminal 48. The focusing terminal 47 is connected as indicated to the focusing anodes 22, 23 and 24 of the tri-color kinescope 15. Likewise, the convergence wave terminal 48 is connected to the convergence anode 28 of the kinescope. Since the composite control waves impressed upon the focusing and convergence anodes of the kinescope vary at both the horizontal and vertical deflection frequencies, the desired control of the electron beam focusing and convergence is effected.

For a better understanding of the apparatus comprising the present invention, reference now will be made to Figure 2 of the drawings. The vertical sweep output stage includes an electron tube 49 of the type indicated and connected for control of the vertical deflection coil of the yoke in a somewhat conventional manner. The output circuit of the tube 49 is derived from the anode which is coupled by an output transformer 51 to the vertical deflection coil of the yoke as indicated. The primary and secondary windings 52 and 53, respectively, of the vertical output transformer 51 are connected to other apparatus by means of which to develop the desired convergence control wave at the vertical frequency.

In connection with the description of this apparatus, additional reference will be made to Figures 3*a*–3*e* of the drawings. The substantially sawtooth wave 54 of Figure 3*a* having a peaking component 55 is developed across the primary winding 52 of the vertical output transformer. A wave of substantially the same shape also is developed across the secondary winding 53. The sawtooth wave developed in the primary winding 52 is impressed upon a clipping circuit including a resistor 56 and a rectifier such as a crystal diode 57. As a result of the operation of this circuit, there is developed across a potentiometer resistor 58 a substantially sawtooth wave such as the wave 59 of Figure 3*b*. It is to be noted that the peaking component 61 of this wave has been materially reduced compared to the peaking component 55 of the wave 54 shown in Figure 3*a*. By means of the potentiometer 58, any desired magnitude of the wave 59 may be derived.

Figure 3A:
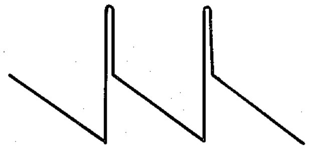
Figure 3B:
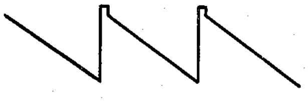
Figure 3C:
Figure 3D:
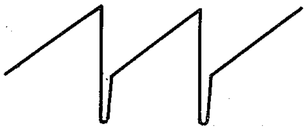
Figure 3E:
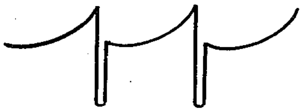

Such a wave 59 is impressed upon an integrating circuit including a resistor 62 and a capacitor 63. By means of this circuit, the substantially sawtooth wave 59 of Figure 3*b* is converted into a generally parabolic wave 64 of negative polarity as indicated in Figure 3*c*. Figure 3*d* shows the substantially sawtooth wave 65 which is developed in the secondary winding 53 of the vertical output transformer 51 across a potentiometer resistor 66. By means of this potentiometer, any desired amplitude of the wave 65 may be derived and coupled by a capacitor 67 for addition to the parabolic wave 64 at the point 68. The combination of the parabolic wave 64 with the sawtooth wave 65 at the point 68 produces the wave 69 illustrated in Figure 3*e*. By suitably adjusting the potentiometers 58 and 66, the amplitude and shape of the combined wave 69 may be suitably altered to effect the desired control of the electron beam convergence and focusing of the tricolor kinescope. In general, the potentiometer 58 controls the amplitude of the produced wave and the setting of the potentiometer 66 controls the tilting of the substantially parabolic wave.

The combined wave is impressed upon the input grid circuit of an amplifier 71 and a substantially parabolic wave of positive polarity is developed at the anode of the amplifier. The anode voltage for the amplifier is supplied from a voltage divider or bleeder network including resistors 72, 73 and 74 connected between two terminals 75 and 76. There is impressed upon the terminal 75, for example, a potential of approximately 670 volts which may be conveniently derived from the boosted "B" supply usually available in the horizontal deflection output circuit. Such a power supply is commonly used and may be in accordance with the system shown in U. S. Patent 2,598,134 granted May 27, 1952, to O. H. Schade and titled "Power Conservation System." The terminal 76 may also have impressed thereon a higher positive potential of the order of 3500 volts, for example. Such a voltage may be provided in the usual manner by means of flyback high voltage power supply, also coupled to the horizontal deflection output circuit, such as that shown in U. S. Patent 2,074,495 granted March 23, 1937, to A. W. Vance and titled "Circuits For Cathode Ray Tubes." Such a high voltage for the amplifier 71 is necessary in order to develop the relatively large amplitude of the parabolic control wave needed to effect the desired dynamic convergence and focusing so that the use of a vertical convergence control wave output transformer may be avoided. Inasmuch as the current drain by the amplifier 71 is relatively small because of the relatively high input impedance, it does not place an excessive load upon the high voltage power supply.

The anode of the amplifier 71 is coupled through the secondary winding 77 of a horizontal dynamic convergence output transformer 78 and further by capacitor 79 to the convergence wave terminal 48. As previously described with reference to Figure 1, this terminal also is connected to the convergence anode 28 of the tri-color kinescope 15. By means of such a connection, it is seen that the amplitude of the parabolic wave developed at the anode of the amplifier 71 is impressed upon the convergence control system. The voltage divider resistor 74 comprising a part of the load impedance for the amplifier 71 is connected as shown to the focusing wave terminal 47 of Figure 1 so that a somewhat reduced amplitude of the parabolic wave developed at the anode of the amplifier 71 is impressed upon the focusing anodes 22, 23 and 24 of the tri-color kinescope 15.

The horizontal sweep output stage connected to the input terminal 35 includes a conventional power amplifier output electron tube 81, the anode of which is connected to an output inductive coil 82 in the usual manner. The coil 82 is conventionally provided with taps which are connected to the horizontal deflection coil of the yoke in a conventional manner as indicated. Also, the coil 82 is connected as an auto-transformer to which is connected a high voltage rectifier diode 85 supplying a final anode voltage of approximately 20 kv. to a terminal 86. A similar high voltage rectifier diode 87 is connected to a lower voltage point on the coil 82 so as to provide a suitable focusing voltage of approximately 3500 volts at a terminal 88. Both of these high voltage power supplies may be of the general type shown in the Vance patent referred to.

Figure 4A:
Figure 4B:
Figure 4C:
Figure 4D:

The horizontal output tube 81 also is provided with the usual cathode circuit comprising a resistor which is capacitively by-passed. In the present instance, the cathode resistor is in the form of a potentiometer 89. This circuit develops a substantially parabolic wave 91 as shown in Figure 4*a*. By means of the potentiometer 89, any desired amplitude of this parabolic wave is derived and coupled by a capacitor 92 to the cathode circuit including a resistor 93 of a grounded grid amplifier 94. The anode of this amplifier is connected to a source of positive potential indicated at +B through a variable inductor 95 which is shunted by the series connection of a capacitor 96 and the primary winding 97 of the horizontal convergence wave output transformer 78. The circuit including the inductor 95, the capacitor 96 and the transformer winding 97 is adjusted by means of the movable core associated with the inductor 95 to have a resonant frequency substantially equal to the horizontal deflection frequency. By means of this circuit, there is produced a substantially sinusoidal wave 98 shown in Figure 4*b*. The frequency of the sine wave 98 relative to the natural frequency of inductor 95 and transformer 78 determines the phasing of the horizontal parabolic convergence wave. Representative examples of the resulting wave shapes due to phasing are shown in the waves 99 and 100 of Figures 4*c* and 4*d*, respectively. The different phasing effectively tilts the output parabolas to the left or to the right, as desired.

The horizontal parabolic wave so produced is coupled into the secondary winding 77 of the transformer 78 and applied in full amplitude to the convergence wave terminal 48. The anode of the amplifier 94 also is coupled by capacitor 102 to the potentiometer bleeder resistor 74 so that a relatively small amplitude of the horizontal convergence wave is impressed upon the focusing wave terminal 47.

It may be seen from the foregoing description of an illustrative embodiment of the invention that there is provided an improved and considerably simplified apparatus by means of which the wave for energizing the electron-optical beam-controlling system of a multi-beam kinescope may be developed. Only a single transformer is required and the tube complement is reduced as compared with other apparatus which has been employed previously for this purpose. By means of the described apparatus, only a single triode coupled to the vertical deflection output circuit is required in order to generate the vertical dynamic convergence and focusing waves. Similarly, only a single triode, together with a small output transformer, is needed to develop the horizontal dynamic convergence and focusing waves. Accordingly, it is seen that not only is the apparatus simpler, but also as a result, the power requirements for the operation of such apparatus is materially less than in previously employed devices.

The nature of the invention may be ascertained from the foregoing description of an illustrative embodiment thereof. Its scope is set out in the appended claims.

What is claimed is:

1. Apparatus for energizing an electron-optical system of a cathode ray device for effecting convergence of a plurality of electron beam components, said energizing apparatus comprising, a source of a substantially sawtooth wave at vertical deflection frequency, wave shaping means coupled to said sawtooth wave source to convert said sawtooth wave to a substantially parabolic wave, wave combining means coupling said sawtooth wave source to said wave shaping means to combine said sawtooth and parabolic waves for the development of a vertical frequency convergence wave, means coupling said wave combining means to said electron-optical system, a source of a substantially parabolic wave at horizontal deflection frequency, wave developing means coupled to said parabolic wave source for adding a sinusoidal wave to said parabolic wave to produce a horizontal frequency convergence wave, and means coupling said wave developing means to said electron-optical system.

2. Apparatus for energizing an electron-optical system of a cathode ray device for effecting convergence of a plurality of electron beam components, said energizing apparatus comprising, a source of a substantially sawtooth wave at vertical deflection frequency, integrating means coupled to said sawtooth wave source to convert said sawtooth wave to a substantially parabolic wave, means including a vertical frequency convergence wave shape controlling potentiometer coupled to said source of vertical sawtooth wave to develop a variable amplitude substantially sawtooth wave, means coupling said wave shape controlling potentiometer to said integrating means to combine said developed sawtooth and parabolic waves, a vertical frequency convergence wave amplifier coupled to impress said combined parabolic and sawtooth waves upon said electron-optical system, a source of a substantially parabolic wave at horizontal deflection frequency, a horizontal frequency convergence wave amplifier coupled to said parabolic wave source, wave developing means coupled to said horizontal frequency convergence wave amplifier for adding a sinusoidal wave to said parabolic wave to produce a horizontal frequency convergence wave, and means including a horizontal frequency convergence wave output transformer coupling said horizontal frequency convergence wave amplifier to said electron-optical system.

3. Apparatus for energizing an electron-optical system of a cathode ray device for effecting convergence of a plurality of electron beam components, said energizing apparatus comprising, a source of a substantially sawtooth wave at vertical deflection frequency, said sawtooth wave having a peaking component, means coupled to said sawtooth wave source and having a vertical frequency convergence wave amplitude controlling potentiometer for substantially eliminating said peaking component, wave shaping means coupled to said vertical frequency convergence wave amplitude controlling potentiometer to convert said sawtooth wave to a substantially parabolic wave, means including a vertical frequency convergence wave shape controlling potentiometer coupled to said source of vertical sawtooth wave to develop a variable amplitude substantially sawtooth wave, means coupling said wave shape controlling potentiometer to said wave shaping means to combine said developed sawtooth and parabolic waves, a vertical frequency convergence wave amplifier having an input circuit and an output circuit, means impressing said combined parabolic and sawtooth waves upon said vertical frequency convergence wave amplifier input circuit, means coupling said vertical frequency convergence wave amplifier output circuit to said electron-optical system, a source of a substantially parabolic wave at horizontal deflection frequency, a horizontal frequency convergence wave amplifier having an input circuit and an output circuit, means coupling said horizontal frequncy convergence wave amplifier input circuit to said parabolic wave source, and means including a horizontal frequency convergence wave output transformer coupling said horizontal frequency convergence wave amplifier output circuit to said electron-optical system.

4. Apparatus for energizing an electron-optical system of a cathode ray device for effecting convergence of a plurality of electron beam components, said energizing apparatus comprising, a source including an electron tube of a substantially sawtooth wave at vertical deflection frequency, said sawtooth wave having a peaking component, a clipping circuit coupled to said sawtooth wave source electron tube and having a vertical frequency convergence wave amplitude controlling potentiometer for substantially eliminating said peaking component, an integrating circuit coupled to said vertical frequency convergence wave amplitude controlling potentiometer to convert said clipped sawtooth wave to a substantially parabolic wave, means including a vertical frequency convergence wave shape controlling potentiometer coupled to said source of vertical sawtooth wave to develop a variable amplitude substantially sawtooth wave, means coupling said wave shape controlling potentiometer to said integrating circuit to combine said developed sawtooth and parabolic waves, a vertical frequency convergence wave amplifier including an electron tube having an input circuit and an output circuit, means impressing said combined parabolic and sawtooth waves upon said vertical frequency convergence wave amplifier input circuit, means coupling said vertical frequency convergence wave amplifier output circuit to said electron-optical system, a source including an electron tube of a substantially parabolic wave at horizontal deflection frequency, a horizontal frequency convergence wave amplitude controlling potentiometer connected to said horizontal frequency convergence wave electron tube, a horizontal frequency convergence wave amplifier including an electron tube having an input circuit and an output circuit, means coupling said horizontal frequency convergence wave amplifier input circuit to said horizontal frequency convergence wave amplitude controlling potentiometer, and means including a horizontal frequency convergence wave output transformer coupling said horizontal frequency convergence wave amplifier output circuit to said electron-optical system.

5. Apparatus for energizing an electron-optical system of a cathode ray device for effecting convergence of a plurality of electron beam components, said energizing apparatus comprising, a source including the anode circuit of an electron tube of a substantially sawtooth wave at vertical deflection frequency, said sawtooth wave having a peaking component, a clipping circuit including a crystal diode coupled to said sawtooth wave source anode circuit and having a vertical frequency convergence wave amplitude controlling potentiometer for substantially eliminating said peaking component, an integrating circuit coupled to said vertical frequency convergence wave amplitude controlling potentiometer to convert said clipped sawtooth wave to a substantially parabolic wave, a deflection output transformer having primary and secondary windings, means coupling said primary winding to said sawtooth wave source anode circuit, means including a vertical frequency convergence wave shape controlling potentiometer coupled to said secondary winding to develop a substantially sawtooth wave, means coupling said wave shape controlling potentiometer to said integrating circuit to combine said developed sawtooth and parabolic waves, a vertical frequency convergence wave amplifier including an electron tube having an input circuit grid electrode and an output circuit anode electrode, means impressing said combined parabolic and sawtooth waves upon said vertical frequency convergence wave amplifier grid electrode, means coupling said vertical frequency convergence wave amplifier anode electrode to said electron-optical system, a source including the cathode circuit of an electron tube of a substantially parabolic wave at horizontal deflection frequency, said cathode circuit including a capacitively by-passed horizontal frequency convergence wave amplitude controlling potentiometer, a horizontal frequency convergence wave amplifier including an electron tube having an input circuit cathode electrode and an output circuit anode electrode, means coupling said horizontal frequency convergence wave amplifier cathode electrode to said horizontal frequency convergence wave amplitude controlling potentiometer, and means including a horizontal frequency convergence wave output transformer coupling said horizontal frequency convergence wave amplifier anode electrode to said electron-optical system.

6. Apparatus for energizing an electron-optical system of a cathode ray device for effecting convergence of a plurality of electron beam components, said energizing apparatus comprising, a source of a substantially sawtooth wave at vertical deflection frequency, said sawtooth wave having a peaking component, means coupled to said sawtooth wave source and having a vertical frequency convergence wave amplitude controlling potentiometer for substantially eliminating said peaking component, wave shaping means coupled to said vertical frequency convergence wave amplitude controlling potentiometer to convert said sawtooth wave to a substantially parabolic wave, means including a vertical frequency convergence wave shape controlling potentiometer coupled to said source of vertical sawtooth wave to develop a variable amplitude substantially sawtooth wave, means coupling said wave shape controlling potentiometer to said wave shaping means to combine said developed sawtooth and parabolic waves, a vertical frequency convergence wave amplifier having an input circuit and an output circuit, means impressing said combined parabolic and sawtooth waves upon said vertical frequency convergence wave amplifier input circuit, means coupling said vertical frequency convergence wave amplifier output circuit to said electron-optical system, a source of a substantially parabolic wave at horizontal deflection frequency, a horizontal frequency convergence wave amplifier having an input circuit and an output circuit, means coupling said horizontal frequency convergence wave amplifier input circuit to said parabolic wave source, wave developing means in said horizontal frequency convergence wave amplifier output circuit for adding a horizontal frequency sinusoidal wave to said horizontal frequency parabolic wave, and means including a horizontal frequency convergence wave output transformer coupling said horizontal frequency convergence wave amplifier output circuit to said electron-optical system.

7. Apparatus for energizing an electron-optical system of a cathode ray device for effecting a convergence of a plurality of electron beam components, said energizing apparatus comprising, a source including an electron tube of a substantially sawtooth wave at vertical deflection frequency, said sawtooth wave having a peaking component, a clipping circuit coupled to said sawtooth wave source electron tube and having a vertical frequency convergence wave amplitude controlling potentiometer for substantially eliminating said peaking component, an integrating circuit coupled to said vertical frequency convergence wave amplitude controlling potentiometer to convert said clipped sawtooth wave to a substantially parabolic wave, means including a vertical frequency convergence wave shape controlling potentiometer coupled to said source of vertical sawtooth wave to develop a variable amplitude substantially sawtooth wave, means coupling said wave shape controlling potentiometer to said integrating circuit to combine said developed sawtooth and parabolic waves, a vertical frequency convergence wave amplifier including an electron tube having an input circuit and an output circuit, means impressing said combined parabolic and sawtooth waves upon said vertical frequency convergence wave amplifier input circuit, means coupling said vertical frequency convergence wave amplifier output circuit to said electron-optical system, a source including an electron tube of a substantially parabolic wave at horizontal deflection frequency, a horizontal frequency convergence wave amplitude controlling potentiometer connected to said horizontal frequency convergence wave electron tube, a horizontal frequency convergence wave amplifier including an electron tube having an input circuit and an output circuit, means coupling said horizontal frequency convergence wave amplifier input circuit to said horizontal frequency convergence wave amplitude controlling potentiometer, a network resonant at horizontal deflection frequency and connected in said horizontal frequency convergence wave amplifier output circuit for adding a horizontal frequency sinusoidal wave to said horizontal frequency parabolic wave, and means including a horizontal frequency convergence wave output transformer coupling said horizontal frequency convergence wave amplifier output circuit to said electron-optical system.

8. Apparatus for energizing an electron-optical system of a cathode ray device for effecting convergence of a plurality of electron beam components, said energizing apparatus comprising, a source including the anode circuit of an electron tube of a substantially sawtooth wave at vertical deflection frequency, said sawtooth wave having a peaking component, a clipping circuit including a crystal diode coupled to said sawtooth wave source anode circuit and having a vertical frequency convergence wave amplitude controlling potentiometer for substantially eliminating said peaking component, an integrating circuit coupled to said vertical frequency convergence wave amplitude controlling potentiometer to convert said clipped sawtooth wave to a substantially parabolic wave, a deflection output transformer having primary and secondary windings, means coupling said primary winding to said sawtooth wave source anode circuit, means including a vertical frequency convergence wave shape controlling potentiometer coupled to said secondary winding to develop a substantially sawtooth wave, means coupling said wave shape controlling potentiometer to said integrating circuit to combine said developed sawtooth and parabolic waves, a vertical frequency convergence wave amplifier including an electron tube having an input circuit grid electrode and an output circuit anode electrode, means impressing said combined parabolic and sawtooth waves upon said vertical frequency convergence wave amplifier grid electrode, means coupling said vertical frequency convergence wave amplifier anode electrode to said electron-optical system, a source including the cathode circuit of an electron tube of a substantially parabolic wave at horizontal deflection frequency, said cathode circuit including a capacitively by-passed horizontal frequency convergence wave amplitude controlling potentiometer, a horizontal frequency convergence wave amplifier including an electron tube having an input circuit cathode electrode and an output circuit anode electrode, means coupling said horizontal frequency convergence wave amplifier cathode electrode to said horizontal frequency convergence wave amplitude controlling potentiometer, means including a capacitor and a horizontal frequency convergence wave shape controlling variable inductor connected in said horizontal frequency convergence wave amplifier output circuit and being series resonant at horizontal deflection frequency for adding a horizontal frequency sinusoidal wave to said horizontal frequency parabolic wave, and means including a horizontal frequency convergence wave output transformer coupling said horizontal frequency convergence wave amplifier anode electrode to said electron-optical system.

References Cited in the file of this patent

UNITED STATES PATENTS 2,672,574 Evans ---------------- Mar. 16, 1953

FOREIGN PATENTS 503,462 Belgium --------------- Sept. 26, 1952